May 14, 1963   W. GARTEN ETAL   3,089,913
BATTERY CELL
Filed Jan. 23, 1959   2 Sheets-Sheet 1

INVENTORS
Wilhelm Garten
Klaus Dehmelt
Hans von Doehren
Freimut Peters
Michael S. Striker
Attorney May 14, 1963  W. GARTEN ETAL  3,089,913
BATTERY CELL
Filed Jan. 23, 1959  2 Sheets-Sheet 2

INVENTORS

United States Patent Office 3,089,913
Patented May 14, 1963

3,089,913
BATTERY CELL
Wilhelm Garten, Hagen, Westphalia, Klaus Dehmelt and Hans von Dohren, Frankfurt am Main, and Freimut Peters, Hagen, Westphalia, Germany, assignors to Varta Aktiengesellschaft
Filed Jan. 23, 1959, Ser. No. 788,599
Claims priority, application Germany Jan. 25, 1958
11 Claims. (Cl. 136—6)

The present invention relates to a battery cell and a method of forming the same. More particularly, the present invention relates to an alkaline storage battery cell which is hermetically sealed.

When such cells are connected in series, conditions of deep discharge sometimes occur in one or the other of the cells, and gas formation under such conditions must be avoided or at least kept to very low limits, in view of the hermetical sealing of the battery cells. Obviously, the formation and accumulation of substantial quantities of gas would lead otherwise to explosions or bursting of the cells.

More specifically, the present invention is concerned with permanently hermetically sealed alkaline batteries or cells thereof in which the electrolyte is contained and substantially adhered in the pores of the electrodes and separators.

Previously it has been proposed to provide permanently hermetically sealed batteries with negative electrodes of such dimensions that the same possess a greater capacity to accept electric energy, measured in ampere hours, and to discharge the same, than the positive electrodes, whereby, furthermore, the negative electrodes are to be at the time of sealing of the battery in such electrochemical state that the same are capable of accepting a larger quantity of electric energy than the positive electrodes. In other words, at the time of sealing the battery and prior to forming or charging the same, the negative electrodes were to possess a charge reserve. In this manner it is possible to prevent harmful over-pressure in the sealed battery during charging and super-charging of the same, however, upon deep-discharge, such as can happen in one or the other of in series connected cells, dangerous over-pressure will occur which might cause destruction of the battery.

Gas-tight batteries also have been described in which the positive electrode possesses a greater capacity to accept electric energy measured in ampere hours and to discharge the same, than the negative electrode and in which a greater amount of electric energy measured in ampere hours is stored in the positive electrodes than in the negative electrodes at the time of sealing of the battery, so that the positive electrodes possess a discharge reserve. In this manner, during deep-discharge of the battery and reversal of the polarity of the same, the increase in pressure is at first reduced, however, upon prolonged reversal of polarity excessive over-pressure will occur within the cell and possibly lead to damage or destruction of the same.

It is therefore an object of the present invention to overcome the above discussed shortcomings of prior art batteries.

It is another object of the present invention to provide a battery cell which can be operated in sealed condition without forming excessive over-pressure under conditions of super-charge and deep discharge.

It is a further object of the present invention to provide a method for forming a sealed storage battery which will not be subject to the above described disadvantages.

It is yet another object of the present invention to provide a storage battery comprising a plurality of cells connected in series, which storage battery can be operated in hermetically sealed condition without building up harmful over-pressure, as well as to provide a simple and economical method for achieving this objective.

Other objects and advantages of the present invention will become apparent from a further reading of the description and the appended claims.

With the above and other objects in view, the present invention contemplates an alkaline storage battery cell, comprising in combination, a casing, means for hermetically sealing the casing, at least one positive and one negative electrode located in the casing, separator means between adjacent electrodes, and an electrolyte contacting the electrodes, the positive electrode including positive active mass and the negative electrode including negative active mass, the quantity of positive active mass of the positive electrode measured in electrochemical equivalents being at least equal to the quantity of the negative mass of the negative electrode, the ability of the negative electrode to store electric energy upon charging of the battery being greater than the corresponding ability of the positive electrode so that the negative electrode possesses a charge reserve and the positive electrode a discharge reserve, the positive electrode being in electrical contact with an antipolar mass, and the negative electrode being in electrical contact with an antipolar mass, the quantity of antipolar mass of the negative electrode being such that upon deep-discharge of the battery cell and reversal of polarity in the same, oxidation of the negative electrode will terminate and oxygen formation thereon will start after oxidation of the antipolar mass at a stage at which the antipolar mass in contact with the positive electrode is only partially reduced and thus does not evolve hydrogen gas.

According to one embodiment, the present invention comprises in a charged alkaline storage battery cell, a casing, means for hermetically sealing the casing, at least one negative and at least one positive electrode located in the casing, separator means between adjacent electrodes, an electrolyte contacting the electrodes, the positive electrode including positive active mass and the negative electrode including negative active mass, the total amount of electrochemical equivalents of the negative active mass of the negative electrode being maximally as great as the total amount of electrochemical equivalents of the positive active mass of the positive electrode, the amount of charged electrochemical equivalents of the positive active mass of the positive electrode being greater than the amount of charged electrochemical equivalents of the negative active mass of the negative electrode so that the negative electrode possesses a charge reserve while the positive electrode possesses a discharge reserve, an antipolar mass in electrical contact with the positive electrode, and an antipolar mass in electrical contact with the negative electrode, the quantity of antipolar mass in contact with the negative electrode being such that upon deep-discharge of the battery cell and reversal of polarity in the same, oxidation of the negative electrode will terminate and oxygen formation thereon will start after oxidation of the antipolar mass at a stage at which the antipolar mass in contact with the positive electrode is only partially reduced and thus does not evolve hydrogen gas.

According to a preferred embodiment, the present invention includes in an unformed alkaline storage battery cell, in combination, a casing, means for hermetically sealing the casing, at least one negative and at least one positive electrode located in the casing, separator means between adjacent electrodes, an electrolyte contacting the electrodes, the positive electrode including positive active mass and the negative electrode including negative active mass, the total amount of electrochemical equivalents of the negative active mass of the negative electrode being maximally as great as the total amount of electrochemical equivalents of the positive active mass of the positive electrode, the negative electrode possessing a charge reserve while the positive electrode possessing a discharge reserve, the negative active mass of the negative electrode being substantially completely in uncharged state and either a portion only of the positive active mass of the positive electrode being in charged state so that, when the positive and negative electrodes are charged together to the full chargeable capacity of the positive electrode, a portion of negative active mass of the negative electrode remains uncharged, an antipolar mass in electrical contact with the positive electrode, and an antipolar mass in electrical contact with the negative electrode, or alternatively the antipolar mass in contact with the negative electrode consisting partly of $Ni(OH)_3$, the latter being present in a quantity corresponding to the discharge reserve of the positive electrode so that in both cases upon deep-discharge of the battery cell and reversal of polarity in the same, oxidation of the negative electrode will terminate and oxygen formation thereon will start after oxidation of the antipolar mass at a stage at which the antipolar mass in contact with the positive electrode is only partially reduced and thus does not evolve hydrogen gas.

The part of the positive electrode which, as described above, is in charged state may consist of pre-oxidized material such as $Ni(OH)_3$, or the negative active mass of the negative electrode may include a portion which is oxidized beyond the state of oxidation obtained upon complete discharge of the cell, consisting for instance of cadmium peroxide, and corresponding to the discharge reserve of the positive electrode.

According to another embodiment of the present invention, the alkaline electrolyte which is in contact with the electrodes, will contain active oxygen, for instance in the form of a per-oxy compound soluble in the electrolyte, in a quantity corresponding in electrochemical equivalents to the discharge reserve of the positive electrode. Upon sealing and forming of the battery cell, the per-oxy compound will then react to create the above discharge reserve.

The present invention also comprises in a method of forming an alkaline storage battery cell having at least one positive and at least one negative electrode, each of the electrodes including regular and antipolar active mass, the quantity of regular active mass of the positive electrode measured in electrochemical equivalents being at least equal to the quantity of regular active mass of the negative electrode, the step of precharging a portion of the regular active mass of the positive electrode, hermetically sealing and thereafter charging the cell, so that when the positive and the negative electrodes are charged together to the full chargeable capacity of the positive electrode, a portion of the regular active mass of the negative electrode remains uncharged.

Thus, according to the present invention, it is possible to provide a hermetically sealed storage battery in which during charging as well as during super-charging and also during discharging and deep-discharge connected with reversal of polarity, hydrogen gas formation will not occur and oxygen gas will evolve only within limits which will not cause harmful over-pressure within the hermetically sealed cell. Thus, the storage battery according to the present invention appears capable of safe and reliable operation as a hermetically sealed battery under all possible operating conditions.

The present invention accomplishes its objectives by providing that the quantity of active mass forming part of the positive electrode, measured in electrochemical equivalents, is equal to or greater than the corresponding quantity of the active mass of the negative electrode, furthermore that in any condition the negative electrode possesses a greater ability for storing electric energy than the positive electrode, so that the negative electrode possesses a charge reserve and consequently the positive electrode a discharge reserve, furthermore providing that the positive electrode contains in addition to its regular active mass, a sufficient quantity of antipolar mass, for instance $Cd(OH)_2$ that upon deep-discharge and reversal of polarity the oxidation of the antipolar mass of the negative electrode is completed and oxygen generation starts only at a stage when the antipolar mass forming part of or being electrically connected with the positive electrode, is only partially reduced so that no hydrogen gas evolves at the same.

In the case of a nickel-cadmium battery, taken as an example herein, the following will occur:

In the case of deep-discharge of the storage battery cell with concurrent reversal of its polarity, the capacity of the battery will be limited by its negative electrode whereby at first the voltage will drop only slightly below 0 volt since the positive electrode, due to its discharge reserve, maintains its original potential. During this period, the negative electrode whose polarity has been reversed does not yet evolve any oxygen since the antipolar mass which according to the present invention is included in or connected with the negative electrode, consisting for instance of $Ni(OH)_2$, must first be charged, i.e. oxidized to $Ni(OH)_3$. After exhaustion of the discharge reserve of the positive electrode, the polarity of the same is reversed, whereafter reduction of the antipolar mass of the positive electrode to metallic cadmium will start without producing hydrogen gas. The voltage is now finally reversed to a potential which corresponds inversely to the charge potential of a nickel-cadmium cell.

Before all of the antipolar mass of the positive electrode, i.e. the $Cd(OH)_2$, is reduced to Cd, oxygen gas formation of the now oxidized antipolar mass of the negative electrode will start. The thus formed oxygen gas will oxidize the already formed metallic Cd surface areas at the positive electrode and in this manner it is achieved according to the present invention that upon deep-discharge of the cell an equilibrium will be established between oxygen gas formation and consumption.

In the case of super-charging, formation of hydrogen gas will be prevented since the negative electrode possesses a charge reserve. The oxygen gas generated at the positive electrode will be bound by the metallic cadmium mass of the negative electrode in the form of an oxide or hydroxide. Thus, equilibrium between oxygen gas formation and consumption will be established already at a very low oxygen gas pressure.

By way of example only, the following relative dimensions of a storage battery according to the present invention are given.

*Example I*

| | Percent |
|---|---|
| Capacity of the battery | 100 |
| Regular negative active mass of the negative electrode, expressed in electrochemical equivalents | 110 |
| Antipolar mass of the negative electrode, expressed in electrochemical equivalents | 30 |
| Charge reserve of the negative electrode, expressed in electrochemical equivalents | 10 |
| Regular positive active mass of the positive electrode, expressed in electrochemical equivalents | 120 |
| Antipolar mass of the positive electrode, expressed in electrochemical equivalents | 20 |
| Discharge reserve of the positive electrode, expressed in electrochemical equivalents | 20 |

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1 and 2 schematically illustrate the conditions prevailing in the hermetically sealed alkaline storage battery of the present invention during discharge and deep-discharge of the same;

FIGS. 3 and 4 schematically illustrate the conditions prevailing in the hermetically sealed alkaline storage battery of the present invention during the last stage of charging of the same, and, during subsequent super-charging of the battery.

Referring now to the drawings, and particularly to FIG. 1, it will be seen that therein the electrochemical equivalents of the negative and positive electrodes of the battery cell are schematically illustrated. Hereby, reference numeral 1 indicates the regular negative mass which includes the mass of the charge reserve, in the drawing particularly indicated by reference numeral 3. Reference numeral 4 denotes the antipolar mass which has been added in the negative electrode.

The regular active mass of the positive electrode is identified by reference numeral 2 and the antipolar mass added to the positive electrode by reference numeral 5.

FIG. 2 illustrates the time curve of pressure and electric potential during discharge and deep-discharge with reversal of polarity. $t$ indicates the time, $p$ the pressure and V the voltage. Time extends along the abscissa, and pressure and voltage along the ordinate. The full line starting at the left upper portion of the figure somewhat above $+1$ v. and extending towards the right lower portion somewhat below $-1$ v. represents the potential at the terminals of the cell, the line indicated by a series of plus signs represents the potential of the positive electrode measured against an auxiliary electrode, the broken line similarly represents the potential of the negative electrode. The dotted line $p$ illustrates the pressure development in the sealed cell.

In similar manner, FIGS. 3 and 4 illustrate schematically the conditions prevailing in the storage battery cell according to the present invention during the last stages of charging of the same and during super-charging. Reference numerals 1, 2 and 3 represent the same elements as are represented by these numerals in FIG. 1, the full line extending towards the right of FIG. 4 and starting in the left upper portion of the figure somewhat above $+1$ v. represents the terminal voltage of the battery, and dotted line $p$ schematically illustrates the development of limited pressure during super-charging of the cell.

It must be noted that the present invention is not to be considered limited to the specific conditions described as illustrative only of the present invention, but that the present invention encompasses all types of hermetically sealed alkaline storage batteries which include the essential features of the present invention, such as batteries having active masses consisting of iron and cobalt and their oxides and hydroxides.

It is a surprising and highly advantageous result of the present invention that even upon deep-discharge beyond reversal of polarity, as well as upon super-charging the cell or battery, the formation of hydrogen gas is prevented so that safe and reliable operation of the storage battery under all possible conditions of charge and discharge is assured. The foregoing is particularly advantageous when a plurality of cells are combined in one battery and reversal of polarity occurs, since after reversal of polarity of the negative electrode for some time no gas at all is developed and thus no harmful pressure is produced. Later occurring oxygen gas formation at the negative electrode starts so slowly, due to the added antipolar mass such as nickel hydroxide, that an equilibrium between oxygen formation at the originally negative electrode and oxygen consumption at the, in the meantime, partially reduced antipolar mass at the originally positive electrode will be established, and thus formation of harmful pressure within the affected cell cannot occur.

According to a preferred embodiment of the present invention, the antipolar masses of the positive and negative electrodes are admixed to the regular active masses of the respective electrodes. According to another embodiment of the present invention, the antipolar masses of the positive and/or negative electrodes are contained in separate portions of the same spaced from the regular active masses.

It has been found to be particularly advantageous to use in the storage battery according to the present invention electrodes which include electrically conductive carrier members, preferably sinter or press electrodes, and in which the regular and/or antipolar active masses are formed by chemical and/or electrochemical methods.

The discharge reserve of the positive electrode which is provided according to the present invention can be arranged by having the regular active mass of the positive electrode, prior to sealing of the battery, consisting, in a proportion corresponding to the discharge reserve of the positive electrode, of pre-oxidized mass, for instance $Ni(OH)_3$, subsequent sealing of the battery and charging or forming of the same in sealed condition.

Finally, it is possible, according to the present invention, to obtain in the battery a condition corresponding to the desired discharge reserve of the positive electrode, by including during the assembly of the battery and prior to sealing of the same, in the alkaline electrolyte active oxygen, for instance in the form of per-oxy compounds which are soluble in the alkaline electrolyte, such as perborates or percarbonates. The thus introduced active oxygen must then correspond in electrochemical equivalents to the desired discharge reserve of the positive electrode. Thereafter, the cell or battery is sealed, and formed by being charged in sealed condition.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying further drawings, in which:

Figure 1:
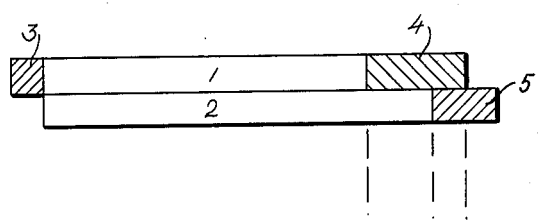
Figure 2:
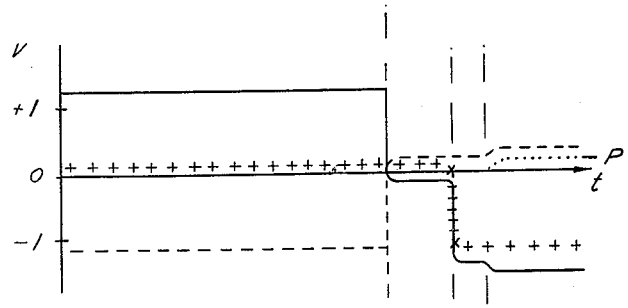
Figure 3:
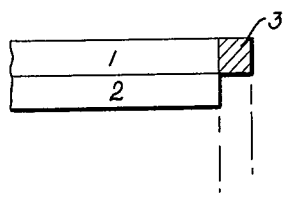
Figure 4:
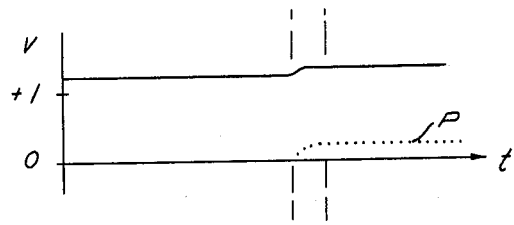
Figure 5:
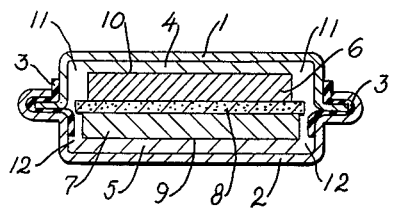
FIG. 5 is a cross sectional view of a button-shaped battery according to the present invention and comprising a single pair of electrodes.

Referring now to the drawings and particularly to FIG. 5, the upper portion 1 and the lower portion 2 of the housing are shown, preferably made of metal. In the areas where housing portions 1 and 2 overlap each other, an insulating intermediate layer 3 is provided, consisting of rubber or of a synthetic material such as a polyamide. The electrode pair 6 and 7 is arranged within the housing and separated by interposed separator 8. Advantageously, electrodes 6 and 7 as well as separator 8 are formed with fine pores. Separator 8 may also consist of a densely woven or otherwise produced fabric, or of a filter paper-like material made of natural or synthetic fibers, or of a semi-permeable foil of regenerated cellulose, of a micro-porous synthetic membrane or the like, or of a combination of several layers of the above materials. Electrodes 6 and 7 possess large surface areas which are in contact with the gas space within the battery. These areas are indicated in FIG. 5 by reference numerals 9 and 10 denoting opposite faces of electrodes 6 and 7, respectively, which serve for the electro-chemical reaction of the gases. To maintain the electrode faces 9 and 10 spaced from the inner walls of housing portions 1 and 2, spaces 4 and 5 are provided formed as a framework with relatively large open intermediate spaces. It is necessary to maintain the electrodes spaced from the housing in order to provide sufficient contact area between the gases formed during the operation of the battery and the electrodes. Spaces 4 and 5 preferably consist of metal so as to form conductive connections between the respective electrodes and housing portions. At least one of spaces 4 and 5 possesses a certain degree of resiliency. No special connections to the terminals of the battery are needed due to the metallic spaces 4 and 5. The gas space includes in addition to the areas between electrode face 10 and housing portion 1, and electrode face 9 and housing portion 2, also the areas indicated by reference numerals 11 and 12, which, however are of lesser size and effectiveness than the areas between the electrodes and the housing.

Figure 6:
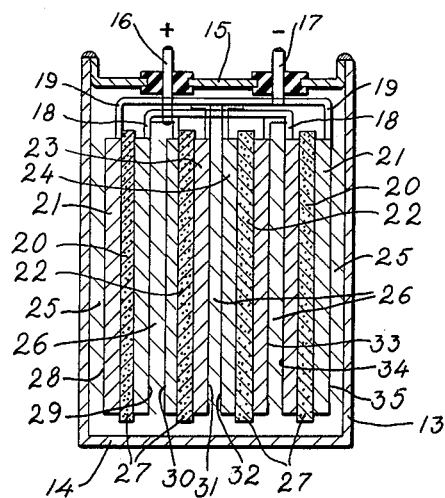
FIG. 6 is an elevational view in cross section of a battery according to the present invention and having a rectangular horizontal cross section.
Figure 7:
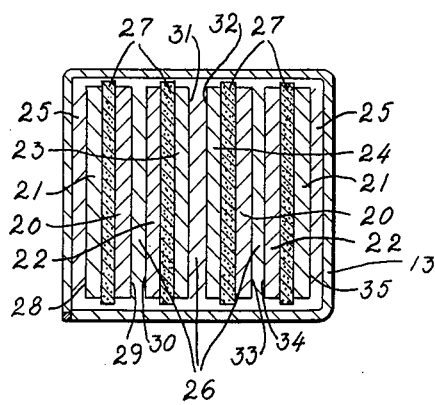
FIG. 7 is a plan view in cross section of the battery illustrated in FIG. 6.

The battery illustrated in FIGS. 6 and 7 is basically constructed in a manner somewhat similar to the battery illustrated in FIG. 5.

Housing 13 is closed by bottom plate 14 and cover member 15. Elements 13, 14 and 15 are preferably made of metal. Terminals 16 and 17 penetrate through cover member 15 and are insulated against the same. Terminals 16 and 17 are in contact with the positive and negative electrodes within the cell by means of electrical conduits 18 and 19. Terminal 16 is thus connected with electrodes 20 and 22, and terminal 17 with electrodes 21, 23 and 24. Electrodes 20 and 22 form electrode pairs, respectively, and similarly electrodes 23 and 24 form pairs, while electrodes 21 outwardly delimit the set of electrode plates. Spaces 26 are located between electrodes 20 and 22, as well as between electrodes 23 and 24. Spaces 25 are provided between the walls of housing 13 and outermost electrodes 21. Spaces 25 and 26 preferably consist of metal and serve for electrically connecting the split positive and negative electrodes, respectively, as well as the housing. Due to the placing of spaces 25 and 26 between electrodes 20 and 22, 23 and 24, and between housing 13 and electrodes 21, a gas accessible area is formed within the battery. Thus, electrode faces 28, 29, 30, 31, 32, 33, 34 and 35 serve for electro-chemically disposing of the gases formed during operation of the battery. These free electrode faces must be covered by a thin film of electrolyte. Between electrodes of opposite polarity such as between electrodes 21 and 20, 22 and 23, 24 and 20, and 20 and 22, separators 27 are arranged.

However, the battery arrangement according to FIGS. 6 and 7 may also be changed in such a manner that for instance, the positive electrode is formed as a single electrode and that consequently the negative electrode in the interior of the set of electrodes is split into two parts while the outer negative electrodes are separated by spaces from the battery housing.

Figure 8:
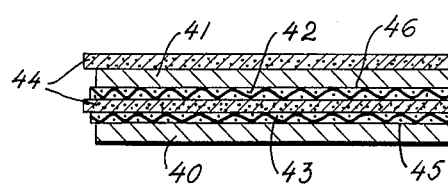
FIG. 8 is a cross sectional view of a flexible electrode arrangement which may be wound to form a roll suitable for insertion into a cartridge-like, cylindrical housing.
Figure 8:
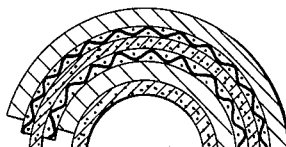

The electrode arrangement according to FIG. 8, is formed in such a manner that the extremely thin electrodes as well as the interposed separators and the metallic netlike spaces having wider openings, are flexible. Consequently, the entire electrode arrangement can be spirally wound into a roll and can be inserted in such shape into a cylindrical housing. In this manner, cylindrical batteries can be formed. The electrode arrangement as illustrated in FIG. 8 comprises an electrode 40, and electrode 41 of a polarity opposite to the polarity of electrode 40. A netlike wide-mesh metallic structure 42 and a similar structure 43, made for instance of lath or wire mesh are placed on the electrodes for the purpose of making one face of each electrode accessible to gas. The faces of the electrodes which will thus come in contact with gas and serve for electro-chemically reacting the same are indicated by reference numerals 45 and 46. The arrangement furthermore includes separators 44.

It will be understood that each of the elements described above, or two or more together, may also find a useful application in other types of storage batteries differing from the types described above.

While the invention has been illustrated and described as embodied in a hermetically sealed alkaline storage battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptation should and are intended to be comprehended within the meaning and range of equivalence of the following claims.

What is claimed as new and desired to be secured by Letters Patent is:

1. An alkaline storage battery cell, comprising, in combination, a casing; means for hermetically sealing said casing; at least one positive and one negative electrode located in said casing; separator means between adjacent electrodes; and an electrolyte contacting said electrodes, said positive electrode including positive active mass and said negative electrode including negative active mass, the entire quantity of positive active mass of said positive electrode measured in electro-chemical equivalents being at least equal to the entire quantity of said negative mass of said negative electrode, said negative electrode being capable upon charging to accept a greater amount of electric energy than said positive electrode so that said negative electrode possesses a charge reserve and said positive electrode a discharge reserve, said positive electrode being in electrical contact with an antipolar mass, and said negative electrode being in electrical contact with an antipolar mass, the quantity of antipolar mass of said negative electrode being such that upon deep discharge of said battery cell and reversal of polarity in the same, oxidation of said negative electrode will terminate and oxygen formation thereon will start after oxidation of its antipolar mass at a stage at which the antipolar mass in contact with said positive electrode is only partially reduced and thus does not evolve hydrogen gas.

2. In a hermetically sealed alkaline storage battery cell, a hermetically sealed casing; at least one positive and one negative electrode located in said casing; separator means between adjacent electrodes; and an electrolyte contacting said electrodes, said positive electrode including positive active mass and said negative electrode including negative active mass, the entire quantity of positive active mass of said positive electrode measured in electro-chemical equivalents being greater than the entire quantity of said negative mass of said negative electrode, said negative electrode being capable upon charging to accept a greater amount of electric energy than said positive electrode so that said negative electrode possesses a charge reserve and said positive electrode a discharge reserve, said positive electrode also including an antipolar mass, and said negative electrode also including an antipolar mass, the quantity of antipolar mass of said negative electrode being such that upon deep discharge of said battery cell and reversal of polarity in the same, oxidation of said negative electrode will terminate and oxygen formation thereon will start after oxidation of its antipolar mass at a stage at which the antipolar mass in contact with said positive electrode is only partially reduced and thus does not evolve hydrogen gas.

3. In a hermetically sealed alkaline storage battery cell, a hermetically sealed casing; at least one positive and one negative electrode located in said casing; separator means between adjacent electrodes; and an electrolyte contacting said electrodes, said positive electrode including positive active mass and said negative electrode including negative active mass, the entire quantity of positive active mass of said positive electrode measured in electro-chemical equivalents being greater than the entire quantity of said negative mass of said negative electrode, said negative electrode being capable upon charging to accept a greater amount of electric energy than said positive electrode so that said negative electrode possesses a charge reserve and said positive electrode a discharge reserve; antipolar mass in electrical contact with and spaced from said positive electrode; and an antipolar mass in electrical contact with and spaced from said negative electrode, the quantity of antipolar mass of said negative electrode being such that upon deep discharge of said battery cell and reversal of polarity in the same, oxidation of said negative electrode will terminate and oxygen formation thereon will start after oxidation of its antipolar mass at a stage at which the antipolar mass in contact with said positive electrode is only partially reduced and thus does not evolve hydrogen gas.

4. A charged alkaline storage battery cell, comprising, in combination, a casing; means for hermetically sealing said casing; at least one negative and at least one positive electrode located in said casing; separator means between adjacent electrodes; an electrolyte contacting said electrodes, said positive electrode including positive active mass and said negative electrode including negative active mass, the total amount of said negative active mass of said negative electrode expressed in electrochemical equivalents being maximally as great as the total amount of said positive active mass of said positive electrode expressed in electrochemical equivalents, the amount of charged positive active mass of said positive electrode expressed in electrochemical equivalents being greater than the amount of charged negative active mass of said negative electrode expressed in electrochemical equivalents so that said negative electrode possesses a charge reserve while said positive electrode possesses a discharge reserve; an antipolar mass in electrical contact with said positive electrode; and an antipolar mass in electrical contact with said negative electrode, the quantity of antipolar mass in contact with said negative electrode being such that upon deep discharge of said battery cell and reversal of polarity in the same, oxidation of said negative electrode will terminate and oxygen formation thereon will start after the oxidation of its antipolar mass at a stage at which the antipolar mass in contact with said positive electrode is only partially reduced and thus does not evolve hydrogen gas.

5. An unformed alkaline storage battery cell, comprising, in combination, a casing; means for hermetically sealing said casing; at least one negative and at least one positive electrode located in said casing; separator means between adjacent electrodes; an electrolyte contacting said electrodes, said positive electrode including positive active mass and said negative electrode including negative active mass, the total amount of said negative active mass of said negative electrode expressed in electrochemical equivalents being maximally as great as the total amount of electrochemical equivalents of said positive active mass of said positive electrode, said negative electrode possessing a charge reserve while said positive electrode possessing a discharge reserve, said negative active mass of said negative electrode being substantially completely in uncharged state and a portion only of said positive active mass of said positive electrode being in chemically preoxidized charged state so that, when said positive and negative electrodes are charged together to the full chargeable capacity of said positive electrode, a portion of negative active mass of said negative electrode remains uncharged; an antipolar mass in electrical contact with said positive electrode; and an antipolar mass in electrical contact with said negative electrode, the quantity of antipolar mass in contact with said negative electrode being such that upon deep discharge of said battery cell and reversal of polarity in the same, oxidation of said negative electrode will terminate and oxygen formation thereon will start after the oxidation of its antipolar mass at a stage at which the antipolar mass in contact with said positive electrode is only partially reduced and thus does not evolve hydrogen gas.

6. An unformed alkaline storage battery cell, comprising, in combination, a casing; means for hermetically sealing said casing; at least one negative and at least one positive electrode located in said casing; separator means between adjacent electrodes; an electrolyte contacting said electrodes, said positive electrode including positive acting mass and said negative electrode including negative active mass, the total amount of said negative active mass of said negative electrode expressed in electrochemical equivalents being maximally as great as the total amount of said positive active mass of said positive electrode expressed in electrochemical equivalents, said negative electrode possessing a charge reserve while said positive electrode possessing a discharge reserve, said negative active mass of said negative electrode being substantially completely in uncharged state and a portion only of said positive active mass of said positive electrode being in chemically preoxidized charged state, said portion consisting essentially of $Ni(OH)_3$ so that, when said positive and negative electrodes are charged together to the full chargeable capacity of said positive electrode, a portion of negative active mass of said negative electrode remains uncharged; an antipolar mass in electrical contact with said positive electrode; and an antipolar mass in electrical contact with said negative electrode, the quantity of antipolar mass in contact with said negative electrode being such that upon deep discharge of said battery cell and reversal of polarity in the same, oxidation of said negative electrode will terminate and oxygen formation thereon will start after the oxidation of the antipolar mass at a stage at which its antipolar mass in contact with said positive electrode is only partially reduced and thus does not evolve hydrogen gas.

7. An unformed alkaline storage battery cell, comprising, in combination, a casing; means for hermetically sealing said casing; at least one negative and at least one positive electrode located in said casing; separator means between adjacent electrodes; an electrolyte contacting said electrodes, said positive electrode including positive active mass and said negative electrode including negative active mass, the total amount of said negative active mass of said negative electrode expressed in electrochemical equivalents being maximally as great as the total amount of said positive active mass of said positive electrode expressed in electrochemical equivalents, said negative electrode possessing a charge reserve while said positive electrode possessing a discharge reserve, said negative active mass of said negative electrode being substantially completely in uncharged state and said positive active mass of said positive electrode being also substantially in uncharged state; an antipolar mass in electrical contact with said positive electrode; and an antipolar mass in electrical contact with said negative electrode, said antipolar mass in contact with said negative electrode consisting partly of $Ni(OH)_3$ the latter being present in a quantity corresponding to the discharge reserve of the positive electrode so that, when said positive and negative electrodes are charged together to the full chargeable capacity of said positive electrode, a portion of negative active mass of said negative electrode remains uncharged, and so that upon deep discharge of said battery cell and reversal of polarity in the same, oxidation of said negative electrode will terminate and oxygen formation thereon will start after oxidation of its antipolar mass at a stage at which the antipolar mass in contact with said positive electrode is only partially reduced and thus does not evolve hydrogen gas.

8. An unformed alkaline storage battery cell, comprising; in combination; a casing; means for hermetically sealing said casing; at least one negative and a least one positive electrode located in said casing; separator means between adjacent electrodes; an electrolyte contacting said electrodes, said positive electrode including positive active mass and said negative electrode including negative active mass, the total amount of said negative active mass of said negative electrode expressed in electrochemical equivalents being maximally as great as the total amount of said positive active mass of said positive electrode expressed in electrochemical equivalents, said negative electrode possessing a charge reserve while said positive electrode possesses a discharge reserve, said negative active mass of said negative electrode being substantially completely in uncharged state and said positive active mass of said positive electrode being substantially in uncharged state; an antipolar mass in electrical contact with said positive electrode; and an antipolar mass in electrical contact with said negative electrode, the quantity of antipolar mass in contact with said negative electrode being such that upon deep discharge of said battery cell and reversal of polarity in the same, oxidation of said negative electrode will terminate and oxygen formation will start after oxidation of its antipolar mass at a stage at which the antipolar mass in contact with said positive electrode is only partially reduced and thus does not evolve hydrogen gas, said electrolyte in contact with said electrodes containing active oxygen in a quantity corresponding in electrochemical equivalents to said discharge reserve of said positive electrode, so that when said positive and negative electrodes are charged together to the full chargeable capacity of said positive electrode, a portion of negative active mass of said negative electrode remains uncharged due to the initial presence of said active oxygen in the electrolyte.

9. An unformed alkaline storage battery cell, comprising; in combination; a casing; means for hermetically sealing said casing; at least one negative and at least one positive electrode located in said casing; separator means between adjacent electrodes; an electrolyte contacting said electrodes, said positive electrode including positive active mass and said negative electrode including negative active mass, the total amount of said negative active mass of said negative electrode expressed in electrochemical equivalents being maximally as great as the total amount of said positive active mass of said positive electrode expressed in electrochemical equivalents, said negative electrode possessing a charge reserve while said positive electrode possesses a discharge reserve, said negative active mass of said negative electrode being substantially completely in uncharged state and said positive active mass of said positive electrode being substantially in uncharged state; an antipolar mass in electrical contact with said positive electrode; and an antipolar mass in electrical contact with said negative electrode, the quantity of antipolar mass in contact with said negative electrode being such that upon deep discharge of said battery cell and reversal of polarity in the same, oxidation of said negative electrode will terminate and oxygen formation thereon will start after oxidation of its antipolar mass at a stage at which the antipolar mass in contact with said positive electrode is only partially reduced and thus does not evolve hydrogen gas, said electrolyte in contact with said electrodes containing active oxygen in the form of a per-oxy compound soluble in said electrolyte and in a quantity corresponding in electrochemical equivalents to said discharge reserve of said positive electrode, so that when said positive and negative electrodes are charged together to the full chargeable capacity of said positive electrode, a portion of negative active mass of said negative electrode remains uncharged due to the initial presence of said peroxy compound in said electrolyte.

10. In a method of forming a hermetically sealed alkaline storage battery cell having at least one positive and at least one negative electrode, each of said electrodes including regular and antipolar active mass, the quantity of regular active mass of said positive electrode measured in electrochemical equivalent being at least equal to the quantity of regular active mass of said negative electrode, the steps of chemically preoxidizing a portion of said regular active mass of said positive electrode while said cell is in unsealed condition; sealing said cell; and thereafter charging said cell, so that when said positive and said negative electrodes are charged together to the full chargeable capacity of said positive electrode, a portion of the regular active mass of said negative electrode remains uncharged.

11. In a method of forming a hermetically alkaline storage battery cell having at least one positive and at least one negative electrode, each of said electrodes including regular and antipolar active mass, the quantity of regular active mass of said positive electrode measured in electrochemical equivalents being at least equal to the quantity of regular active mass of said negative electrode, the steps of chemically preoxidizing said antipolar mass of said negative electrode while said cell is in unsealed condition; sealing said cell; and thereafter charging said cell, so that when said positive and said negative electrodes are charged together to the full chargeable capacity of said positive electrode a portion of the regular active mass of said negative electrode remains uncharged.

References Cited in the file of this patent

UNITED STATES PATENTS

| 2,571,927 | Neumann et al. | Oct. 16, 1951 |
| 2,646,455 | Jeannin | July 21, 1953 |
| 2,842,607 | Germershausen et al. | July 8, 1958 |
| 2,857,447 | Lindstrom | Oct. 21, 1958 |
| 2,934,581 | Dassler | Apr. 26, 1960 |

FOREIGN PATENTS

| 165,982 | Australia | Nov. 14, 1955 |
| 741,345 | Great Britain | Nov. 30, 1955 |
| 769,784 | Great Britain | Mar. 13, 1957 |
| 782,394 | Great Britain | Sept. 4, 1957 |